(12) United States Patent
Knauth et al.

(10) Patent No.: US 8,341,591 B1
(45) Date of Patent: Dec. 25, 2012

(54) METHOD AND SOFTWARE TOOL FOR REAL-TIME OPTIONING IN A SOFTWARE DEVELOPMENT PIPELINE

(75) Inventors: Margaret J. Knauth, Overland, KS (US); Michael W. Kanemoto, Lawrence, KS (US); Matthew E. Perkins, Pleasant Hill, MS (US); James L. Crum, Lenexa, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 1354 days.

(21) Appl. No.: 11/403,773

(22) Filed: Apr. 13, 2006

(51) Int. Cl.
G06F 9/44 (2006.01)
G06Q 10/00 (2012.01)

(52) U.S. Cl. ..... 717/102; 705/7.13; 705/7.23; 705/7.25; 705/7.26

(58) Field of Classification Search ............... None
See application file for complete search history.

(56) References Cited

U.S. PATENT DOCUMENTS

| | | | |
|---|---|---|---|
| 5,408,663 A | 4/1995 | Miller | |
| 5,619,695 A | 4/1997 | Arbabi et al. | |
| 5,907,490 A | 5/1999 | Oliver | |
| 5,953,707 A | 9/1999 | Huang et al. | |
| 6,032,121 A | 2/2000 | Dietrich et al. | |
| 6,216,109 B1 * | 4/2001 | Zweben et al. | 705/8 |
| 6,519,763 B1 * | 2/2003 | Kaufer et al. | 717/101 |
| 6,678,671 B1 | 1/2004 | Petrovic et al. | |
| 6,687,677 B1 | 2/2004 | Barnard et al. | |
| 6,714,915 B1 | 3/2004 | Barnard et al. | |
| 6,993,533 B1 | 1/2006 | Barnes | |
| 7,080,024 B2 | 7/2006 | Thompson | |
| 7,089,193 B2 * | 8/2006 | Newbold | 705/9 |
| 7,139,720 B1 | 11/2006 | Foell et al. | |
| 7,139,999 B2 | 11/2006 | Bowman-Amuah | |
| 7,222,082 B1 | 5/2007 | Adhikari et al. | |
| 7,222,330 B2 | 5/2007 | Bicknell et al. | |
| 8,280,756 B1 | 10/2012 | Kanemoto et al. | |
| 2002/0165742 A1 | 11/2002 | Robins | |
| 2003/0018952 A1 * | 1/2003 | Roetzheim | 717/101 |
| 2003/0083912 A1 | 5/2003 | Covington, III et al. | |
| 2004/0001103 A1 | 1/2004 | Fliess et al. | |
| 2004/0073467 A1 | 4/2004 | Heyns et al. | |
| 2004/0078254 A1 | 4/2004 | Piechl et al. | |

(Continued)

OTHER PUBLICATIONS

Strategies for lifecycle concurrency and iteration—A system dynamics approach Antony Powell, Keith Mander, Duncan Brown Journal of Systems and Software, vol. 46, No. 2-3. Published: Apr. 1999.*

(Continued)

*Primary Examiner* — Emerson Puente
*Assistant Examiner* — Paul Mills

(57) ABSTRACT

As provided, a method for real time optioning includes providing, for each of multiple projects in a software development pipeline, a set of inputs, the inputs comprising at least one input from a group consisting of 1) work-in-progress inputs relating to a current project in a software development pipeline and 2) placeholder inputs relating to a future project in the software development pipeline. The method also includes aggregating the inputs resulting in one or more constraints. The method further includes implementing a test change that has an impact on one or more constraints in the software development pipeline, and outputting, in real-time, the impact of the test change on the one or more constraints in the software development pipeline. The impact is at least one of positive and negative.

15 Claims, 9 Drawing Sheets

U.S. PATENT DOCUMENTS

| | | | |
|---|---|---|---|
| 2004/0111306 A1 | 6/2004 | Yokota et al. | |
| 2004/0117046 A1* | 6/2004 | Colle et al. | 700/99 |
| 2005/0114829 A1 | 5/2005 | Robin et al. | |
| 2005/0114830 A1 | 5/2005 | Knutson et al. | |
| 2005/0120332 A1 | 6/2005 | Martin et al. | |
| 2006/0010418 A1* | 1/2006 | Gupta et al. | 717/101 |
| 2006/0053043 A1* | 3/2006 | Clarke | 705/8 |
| 2006/0235732 A1 | 10/2006 | Miller et al. | |
| 2007/0006161 A1 | 1/2007 | Kuester et al. | |
| 2007/0112945 A1 | 5/2007 | Brown et al. | |
| 2007/0179871 A1 | 8/2007 | Minor et al. | |

OTHER PUBLICATIONS

Integration of system dynamics modelling with descriptive process modelling and goal-oriented measurement Dietmar Pfahl a, Karl Lebsanft Journal of Systems and Software, vol. 46, No. 2-3. Published: Apr. 1999.*

Multiproject Staff Scheduling with Variable Resource Constraints Burton V. Dean, David R. Denzler, and James J. Watkins IEEE Transactions on Engineering Management, vol. 39, No. 1, Published: Feb. 1992.*

Constructively Simple Estimating: A Project Management Example C. Chapman and S. Ward Oct. 2003, The Journal of the Operational Research Society, vol. 54, No. 10, p. 1052.*

ISIS—a knowledge-based system for factory scheduling Mark S. Fox and Stephen F. Smith Appeared i n Expert Systems, vol. 1, No. 1 Jul. 1984.*

Scheduling and Visualization Stephen F. Smith, Marcel A. Becker, Mark A. Derthick, Laurence A. Kramer Technical Report AFRL-IF-RS-TR-2004-142 from Carnegie Mellon University Jun. 2004.*

Toward the Development of Flexible Mixed-Initiative Scheduling Tools Stephen F. Smith and Ora Lassila Published: Mar. 15, 1994.*

Software as a corporate asset M.F.Bott Published: Apr. 2000.*

A framework for an interactive project scheduling system under limited resources Gunduz Ulusoy and Linet Ozdamar Published: 1996.*

Heuristic Scheduling of Capital Constrained Projects Dwight E. Smith-Daniels, Rema Badman, Vicki L. Smith-Daniels Published: 1996.*

Cohen, Morris A., et al., "New Product Development: The Performance and Time-to-Market Tradeoff," Management Science, vol. 42, No. 2, Feb. 1996, 15 pgs.

Advisory Action dated Jun. 28, 2010, U.S. Appl. No. 11/196,692, filed Aug. 3, 2005, 3 pgs.

Armour, Phillip, "Ten Unmyths of Project Estimation," Communications of the ACM, Nov. 2002, vol. 45. No. 11, 4 pgs.

Office Action dated Jun. 8, 2010, U.S. Appl. No. 11/491,203, filed Jul. 21, 2006, 39 pgs.

Office Action dated Mar. 29, 2010, U.S. Appl. No. 11/403,669, filed Apr. 13, 2006, 20 pgs.

Office Action dated Mar. 30, 2010, U.S. Appl. No. 11/403,652, filed Apr. 13, 2006, 26 pgs.

Aoyama, Mikio, "Agile Software Process and Its Experience," Department of Information and Electronics Engineering, IEEE, Niigata Institute of Technology, 1998, pp. 3-12.

Chapman, C., et al., "Constructively Simple Estimating: A Project Management Example," Oct. 2003, The Journal of the Operational Research Society, vol. 54, No. 10, p. 1050-1058.

Jandourek, Emil, "A Model for Platform Development," Hewlett-Packard Journal, Aug. 1996, pp. 1-18.

The Free Dictionary, Definition of Rate Equation, Reaction Rate, http://encyclopedia2.the freedictionary.com/Rate+equation+(chemistry) , 3 pages.

Final Office Action dated Apr. 13, 2010, U.S. Appl. No. 11/196,692, filed Aug. 3, 2005, 47 pages.

Final Office Action dated May 11, 2010, U.S. Appl. No. 11/195,964, filed Aug. 3, 2005, 39 pgs.

Final Office Action dated Dec. 18, 2009, U.S. Appl. No. 11/403,701, filed Apr. 13, 2006, 16 pgs.

Kanemoto, Michael W., et al., "Milestone Initial Scheduling," filed Aug. 3, 2005, U.S. Appl. No. 11/196,692, Specification (23 pgs.) and Drawings (3 sheets).

Crum, James L., et al., "Spreading Algorithm for Work and Time Forecasting," filed Aug. 3, 2005, U.S. Appl. No. 11/195,964, Specification (25 pgs.) and Drawings (4 sheets).

Knauth, Margaret J., et al., "Predictive Growth Bum Rate in Development Pipeline," filed Apr. 13, 2006, U.S. Appl. No. 11/403,669, Specification (27 pgs.) and Drawings (3 sheets).

Kanemoto, Michael W., et al., "Hardware/Software and Vendor Labor Integration in Pipeline Management," filed Apr. 13, 2006, U.S. Appl. No. 11/403,652, Speeification (30 pgs.) and Drawings (6 sheets).

Knauth, Margaret J., et al., "Project Pipeline Management Systems and Methods Havng Capital Expenditure/Expense Flip Targeting," filed Apr. 13, 2006, U.S. Appl. No. 11/403,701, Specification (31 pgs.) and Drawings (6 sheets).

"Wind2 Resource Scheduling and Budgeting (RSB)," Deltek—Resource Planning and Project Budgeting. Software for Professional Consultants:Wind2, http://www.wind2.com/products/rsb.asp, pp. 1-8.

Alsup, Lance A., et al., Patent Application entitled, "Project Estimator", filed Jul. 21, 2006, U.S. Appl. No. 11/491,203.

Heires, James T., et al., What I Did Last Summer: A Software Development Benchmarking Case Study, IEEE Software, Sep./Oct. 2001, pp. 33-39.

Lipner, Steve, "The Trustworthy Computing Security Development Cycle," IEEE Security Conference, Dec. 2004, 12 pages.

Musselman, Kenneth, et al., "The Role of Simulation in Advanced Planning and Scheduling," IEEE Simulation Conference 2002, vol. 2, Dec. 2002, pp. 1825-1830.

Pham, Hoang, et al., "Software Cost Model With Warranty and Risk Costs," IEEE Transactions on Computers, vol. 48, No. 1, Jan. 1999, pp. 71-75.

Office Action dated Sep. 16, 2009, U.S. Appl. No. 11/196,692, filed Aug. 3, 2005, 36 pages.

Office Action dated May 7, 2009, U.S. Appl. No. 11/195,964, filed Aug. 3, 2005, 14 pgs.

Office Action dated Jun. 9, 2009, U.S. Appl. No. 11/403,701, filed Apr. 13, 2006, 16 pgs.

Chapman, C., et al., "Constructively Simple Estimating: A Project Management Example," Oct. 2003, The Journal of the Operational Research Society, vol. 54, No. 10, p. 1052.

Office Action dated Oct. 30, 2009, U.S. Appl. No. 11/195,964, filed Aug. 3, 2005, 19 pgs.

Advisory Action dated Jul. 22, 2010, U.S. Appl. No. 11/195,964, filed Aug. 3, 2005, 3 pgs.

Final Office Action dated Sep. 14, 2010, U.S. Appl. No. 11/403,669, filed Apr. 13, 2006, 22 pgs.

Final Office Action dated Sep. 29, 2010, U.S. Appl. No. 11/403,652, filed Apr. 13, 2006.

Examiner's Answer dated Oct. 5, 2010, U.S. Appl. No. 11/403,701, filed Apr. 13, 2006.

Final Office Action dated Oct. 27, 2010, U.S. Appl. No. 11/491,203, filed Jul. 21, 2006.

Advisory Action dated Nov. 24, 2010, U.S. Appl. No. 11/403,669, filed Apr. 13, 2006.

Examiner's Answer dated Jan. 4, 2011, U.S. Appl. No. 11/195,964, filed Aug. 3, 2005.

Advisory Action dated Dec. 23, 2010, U.S. Appl. No. 11/403,652, filed Apr. 13, 2006.

Advisory Action dated Jan. 6, 2011, U.S. Appl. No. 11/491,203, filed Jul. 21, 2006.

Leffingwell, Dean, et al., "Tactical Management of Agile Development: Achieving Competitive Advantage," Rally Software Development Corporation, 2004.

Rautiainen, Kristian, et al., "4CC: A Framework for Managing Software Product Development," Helsinki University of Technology, Engineering Management Journal, vol. 14, No. 2, Jun. 2002, pp. 27-32.

Office Action dated Mar. 29, 2011, U.S. Appl. No. 11/196,692, filed Aug. 3, 2005.
Final Office Action dated Oct. 4, 2011, U.S. Appl. No. 11/196,692, filed Aug. 3, 2005.
Final Office Action dated Nov. 17, 2011, U.S. Appl. No. 11/403,652, filed Apr. 13, 2006.
Examiner's Answer dated Sep. 12, 2011, U.S. Appl. No. 11/491,203, filed Jul. 21, 2006.
Examiner's Answer dated Sep. 21, 2011, U.S. Appl. No. 11/491,203, filed Jul. 21, 2006.
Office Action dated May 9, 2011, U.S. Appl. No. 11/403,652, filed Apr. 13, 2006.
Notice of Allowance dated Jun. 7, 2012, U.S. Appl. No. 11/196,692, filed Aug. 3, 2005.

* cited by examiner

| Project | Start Date | Demand on Present Quarter in hours | Release | Priority |
|---|---|---|---|---|
| Project Andy | 1/1/06 | 300 | 2/15/07 | High |
| Project Bob | 2/5/06 | 200 | 12/31/06 | Medium |
| Project Chris | 1/20/06 | 110 | 3/30/06 | Low |
| Project Dan | 1/5/06 | 150 | 5/31/06 | Low |
| Project Eric | 2/28/06 | 300 | 2/15/07 | High |
| Project Frank | 3/11/06 | 450 | 3/30/06 | High |

Figure 4:
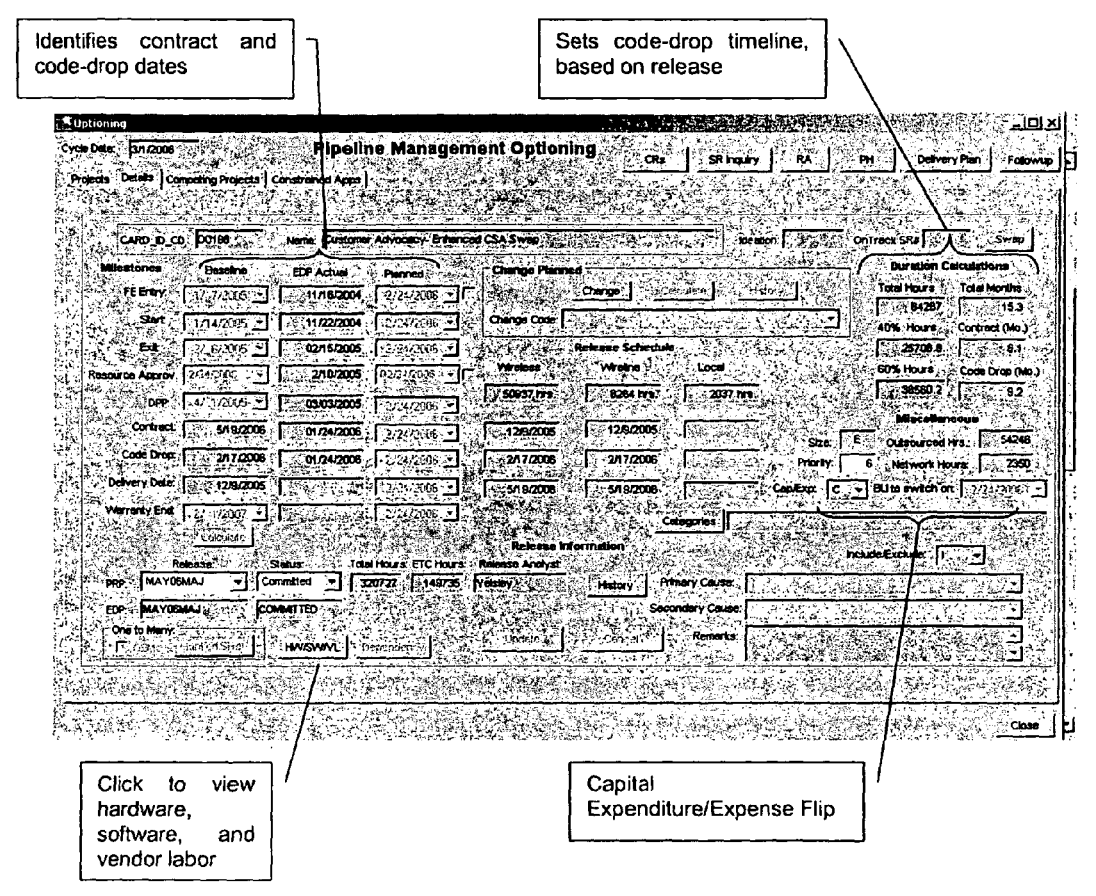

Identifies contract and code-drop dates

Sets code-drop timeline, based on release

Click to view hardware, software, and vendor labor

Capital Expenditure/Expense Flip

METHOD AND SOFTWARE TOOL FOR REAL-TIME OPTIONING IN A SOFTWARE DEVELOPMENT PIPELINE

CROSS-REFERENCE TO RELATED APPLICATIONS

This application includes subject matter related to the following applications, each of which is hereby incorporated by reference: U.S. patent application Ser. No. 11/195,964, filed Aug. 8, 2005, entitled "Spreading Algorithm for Work and Time Forecasting," by James Crum, et al. U.S. patent application Ser. No. 11/196,692, filed Aug. 3, 2005, entitled "Milestone Initial Scheduling," by Michael Kanemoto, et al. U.S. patent application Ser. No. 11/403,652, filed Apr. 13, 2006, entitled "Hardware/Software and Vendor Labor Integration in Pipeline Management," by Kanemoto et al. U.S. patent application Ser. No. 11/403,669, filed Apr. 13, 2006, entitled "Predictive Growth Burn Rate in Development Pipeline," by Knauth et al. U.S. patent application Ser. No. 11/403,701, filed Apr. 13, 2006, entitled "Project pipeline Management Systems and Methods having Capital Expenditure/Expense Flip Targeting" by Knauth et al.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

Project planning is a challenging discipline that may involve planning the coordinated work of many people developing a new product. A major component of project planning is the gathering and analysis of project data. Many parameters interact in generating accurate estimates and feasible plans. Such parameters may often change, thereby requiring that a manager replan one or more projects based on the changed planning parameter. Examples of changed planning parameters may include, for example, an earlier completion date, additional requirements, using outsourced personnel, or sharing technology with another organization. As part of preparing for such changes, managers may wish to create "what if" scenarios regarding one or more projects. These scenarios may be based on changing planning parameters in order to preemptively address problems that may arise. Software tools can facilitate the task of planning, replanning projects, and accurately addressing problems through the use of "what if" scenarios.

SUMMARY OF THE INVENTION

According to some embodiments, a software development pipeline tool is provided. The tool includes an interface component to accept, for each of multiple projects in a software development pipeline, a plurality of inputs, the inputs comprising at least one input from a group consisting of 1) work-in-progress inputs relating to a current project in a software development pipeline and 2) placeholder inputs relating to a future project in the software development pipeline. The tool also includes an optioning component that aggregates the inputs, implements a test change to one or more of the plurality of inputs that has an impact on one or more constraints in the software development pipeline and, in real-time, outputs the impact of the test change on the one or more constraints in the software development pipeline.

A method of real-time optioning is provided. In accordance with embodiments of the present disclosure, a method for real time optioning includes providing, for each of multiple projects in a software development pipeline, a set of inputs, the inputs comprising at least one input from a group consisting of 1) work-in-progress inputs relating to a current project in a software development pipeline and 2) placeholder inputs relating to a future project in the software development pipeline. The method also includes aggregating the inputs resulting in one or more constraints. The method further includes implementing a test change that has an impact on one or more constraints in the software development pipeline, and outputting, in real-time, the impact of the test change on the one or more constraints in the software development pipeline. The impact is at least one of positive and negative.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following description, taken in connection with the accompanying drawings, wherein like reference numerals represent like parts.

FIG. 4 is an illustrative editor window of the software tool GUI according to some embodiments of the present disclosure.

FIG. 5 is an illustrative evaluation window of the software tool GUI according to some embodiments of the present disclosure.

DETAILED DESCRIPTION

Figure 1:
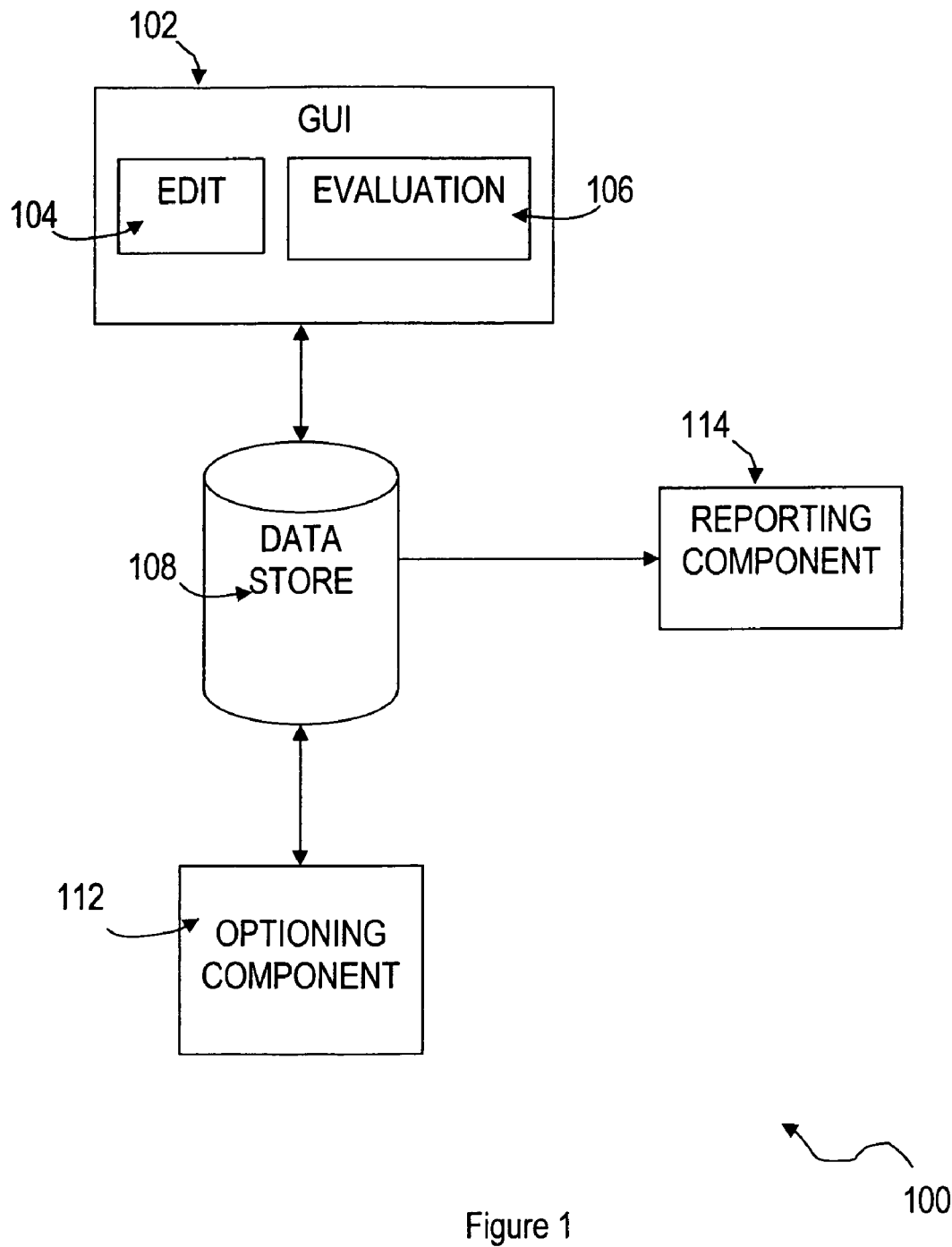
FIG. 1 is a block diagram of a software tool according to some embodiments of the present disclosure.

It should be understood at the outset that although an illustrative implementation of some embodiments of the present disclosure is illustrated below, the present system may be implemented using any number of techniques, whether currently known or in existence. The present disclosure should in no way be limited to the illustrative implementations, draw-} ings, and techniques illustrated below, including the illustrative design and implementation illustrated and described herein.

Disclosed below are methods and tools for exploring various project planning options in real-time ("real-time optioning") in a software development pipeline. The disclosed methods and tools aggregate inputs to generate a model of the software development pipeline, and dynamically implement changes to the model in order to test the long term impact of changes. The disclosed methods and tools enable managers to assess the impact of the changes before actually implementing the changes in the software development pipeline. Real-time optioning provides visibility into how project demand changes align with finances, supply, and timing capacities. Additionally real-time optioning increases efficiency by generating what-if scenarios and options for handling constraints to facilitate project planning within realistic capacities. The real-time aspect of the optioning methods and tools of the present disclosure results in updates or changes to the software development pipeline being reflected in the actual time that it takes the update or change process to occur from the time that the update or change is input, with no delays noticeable to the user.

In a business enterprise, development projects often follow a process that is composed of a sequence of task phases. For example, software projects may begin with a requirements analysis phase, proceed to a design phase, proceed to a coding or implementation phase, proceed to a unit testing phase, proceed to an integration or system testing phase, proceed to a warranty phase, and finish in a maintenance phase. In different enterprises, different phases may be identified and some phases may be added or omitted from the illustrative phases of the project lifecycle. The progress through the project phases need not be entirely sequential and additional analysis may be performed, for example, during later project phases or some coding may be performed, for example, during the design phase.

Over the course of time, circumstances may change, perhaps even drastically, creating the need to test out various scenario solutions to new constraints arising from the changed circumstances. For example, market fluctuations may affect the availability of hardware, software, and/or vendor labor resources. A new, high priority project may arise within the enterprise, throwing off timing of all other ongoing and planned projects, in that it requires reassignment of labor resources and budget resources. The available financial resources may also change drastically due to changes within the enterprise. With the needs of the enterprise, the priority of projects may change over the course of their lives. In each scenario, there is a need to quickly assess how the enterprise might handle the changed circumstances and maintain as many projects as are needed and/or desirable.

A software development pipeline, as referred to herein, is a tool for long term project management for ongoing and planned projects in the various phases described above. The software development pipeline is analogous to a manufacturing assembly line or pipeline, in which different parts of tangible products are being manufactured or assembled at the same time although ultimately there may be some parts that have to be manufactured or assembled before others are. Even if there is some sequential dependency between manufacturing and assembly, the overall process can take advantage of those operations that can proceed concurrently. Likewise, in a software development pipeline, various portions of software development projects may be pursued simultaneously or sequentially.

In various embodiments, the projects are computer software development projects, such as for enterprise software applications. In various embodiments, the software development pipeline is defined by a six quarter planning period. For planning purposes in completing projects in a software development pipeline, including resources such as labor, vendor labor, hardware and software in the analysis, as well as the associated expenses for each, gives an accurate assessment of whether a project can reasonably be completed within a budget.

FIG. 1 provides a block diagram of a software tool 100 for real-time optioning in a software development pipeline. The tool 100 comprises a graphical user interface (GUI) 102, a data store 108, an optioning component 112, and a reporting component 114. The tool 100 may be implemented in software on a general purpose computer system such as that described in greater detail with respect to FIG. 10 below.

The graphical user interface (GUI) 102 receives inputs from the user of the tool. The interface 102 presents, in graphical or textual form, various data to the user of the tool. In various embodiments, the graphical user interface (GUI) 102 further comprises an editor window 104 and an evaluation window 106. The inputs may be obtained via the editor window 104, and the various data, including a software development pipeline model, may be presented via the evaluation window 106. In various embodiments, the user may manually switch between the editor window 104 and the evaluation window 106 during real-time optioning, or alternatively the tool 100 may autonomously switch between the editor window 104 and the evaluation window 106 during real-time optioning. In yet other embodiments, the functions of the evaluation window 106 and the editor window 104 may be combined so that, e.g., the evaluation window 106 includes fields for editing input parameters.

The user of the tool enters inputs relating to either "works-in-progress" projects or anticipated future projects in the software development pipeline. In various embodiments, the inputs include one or more of 1) a target start date, 2) a target stop date, 3) a budget, 4) a target release date, 5) resource demands such as labor, vendor labor, hardware, and software, and 6) project priority. Additionally, the inputs also include supply input available for the total of the projects in the software development pipeline. In various embodiments, the inputs comprise placeholders that are estimates or default values for each of the inputs listed above. Placeholders for anticipated, but as-of-yet uninitiated projects may be manually or automatically altered at a point in time after original entry by returning to the placeholder inputs in the editor window 104. For example, estimates for placeholders may be updated to more accurate values once a project is actually initiated and underway. In various embodiments, the placeholders may be overridden manually, for example once work on the project has begun. The user of the tool may also enter test changes, i.e., modifications to any input data as part of a "what if" scenario to see if the modification eliminates a constraint in the pipeline.

The optioning component 112 is a software component or program that aggregates the inputs to generate a pipeline model and test scenarios with test changes in order to see the efficacy of each test change as a solution to a constraint in the pipeline. In various embodiments, a pipeline model is generated according to methods disclosed in U.S. patent application Ser. No. 11/195,964, filed Aug. 8, 2005, entitled "Spreading Algorithm for Work and Time Forecasting," by James Crum, et al, and U.S. patent application Ser. No. 11/196,692, filed Aug. 3, 2005, entitled "Milestone Initial Scheduling," by Michael Kanemoto, et al, both of which are incorporated herein for reference for all purposes. Spreading involves using data relating to consumption schedules to estimate resource consumption in each phase of a task to obtain greater insight into and understanding of future needs, and timing projects such that they are feasible within the limits of available resources, and affordable within the limits of budgets.

The pipeline model, in various embodiments, may be represented in a textual view, similar to a large spreadsheet, or may be represented in a graphical view, in order to represent a holistic view oriented to the highest organizational level of planning. From the pipeline model representing the pipeline, individual projects or groups of projects may be selected. In various embodiments, the selection may be performed by clicking a link in a textual view, clicking a graphical representation of the project or projects, choosing a project or projects from a drop-down menu, or the like. By selecting in the pipeline model a project or group of projects, the display transfers to one of various other views for additional detail, such as the editor window 104 or the evaluation window 106.

The optioning component 112 is in communication with the data store 108. The pipeline model that is generated based on aggregated inputs to enable visualization of impacts downstream and in the future. For example, an enterprise may have as many as thousands of ongoing and planned projects, so to effectively evaluate how test changes will impact the enterprise as a whole, the pipeline model aggregates data from throughout the enterprise. With each input, the pipeline model is dynamically updated to reflect what has been entered via the editor window 104 such that the pipeline model is readily accurate and up-to-date for the user of the tool.

The optioning component 112 is a software component or program that performs and/or controls the processes described below with reference to FIG. 6, and more specifically, the processes described below with reference to FIGS. 7, 8, and 9. Under control of user inputs to the interface 102, the optioning component 112 leads the user through the process of real-time optioning for one or more projects or groups of projects in the software development pipeline and experimenting with "what if" scenarios as solutions to constraints that arise in the pipeline. A constraint arises where, based on the inputs, a project cannot be achieved as timed, such as for example, labor demands for the project exceed the available supply or software or hardware needed will not be available soon enough. Through the editor window 104 of the interface 102, the user can, by way of the optioning component 112, dynamically alter or update the schedule of all projects, groups of projects, or even individual projects, and see what the impact of the test changes are in the software development pipeline in real-time. Similarly, the user can dynamically modify the actual hours make-up of a project itself, the placeholders, budgetary allocations and the like and see what the impact of the test changes are in the software development pipeline in real-time. By doing so, the user may identify a desirable test change to be implemented, and try out various scenarios in order to implement the test change without introducing further distress to the software development pipeline as an aggregate. In various embodiments, the optioning component may alter just one input in the software development pipeline or multiple inputs at a time. In various embodiments, which input or inputs are altered may depend on what the input is and how it affects other inputs. Since the impact of the test change is dynamically reflected in the pipeline model, with each test change, the user can examine the pipeline model for improvement. In the event that a test change or series of test changes results in negative impacts, such as creating a greater number of constraints or more severe constraints than the constraint the test change was meant to correct, the test change may be undone and not implemented. When a test change is implemented, managers of any impacted projects are notified.

Figures 2, 3:
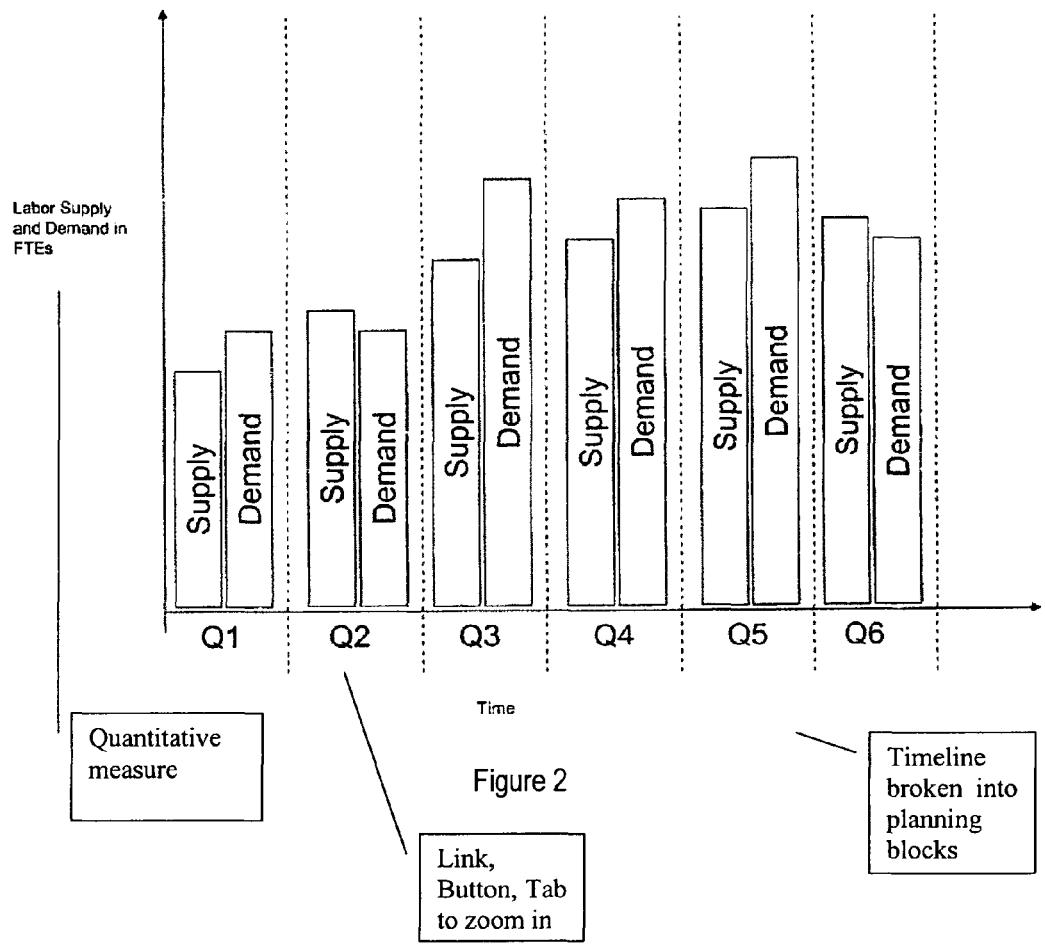
FIG. 2 is an illustrative view of an evaluation window in the GUI that reflects the software development pipeline, in accordance with some embodiments of the present disclosure.
FIG. 3 is an illustrative view of an evaluation window 106 in the interface 102 providing greater detail to which a user may be transferred from the view of FIG. 2.

FIG. 2 is one illustrative view of an evaluation window 106 in the interface 102 that reflects the software development pipeline, in an embodiment for six quarter planning. As shown in FIG. 2, the whole software development pipeline, or alternatively a portion of it, may be shown graphically. Along a first axis, a timeline for the planning period is shown, broken into manageable planning blocks, such as, for example, quarters. Each quarter shown may comprise a link, button, tab or the like which may be selected by the user. Along the second axis is a quantitative measure of inputs in the software development pipeline create a graphical representation of the pipeline status. As shown in FIG. 2, the quantitative measure may comprise values for labor supply and labor demand, in units of hours or Full Time Employees ("FTEs"), graphed against time. The growth and decline of labor supply and labor demand may be charted across the planning period. For detail into the trend over time, the user may select a particular quarter or particular balance between supply and demand to zoom into another view.

FIG. 3 is another illustrative view of an evaluation window 106 in the interface 102 showing a more detailed view to which a user may be transferred from the view of FIG. 2. Specifically, by selecting one of the links for a given quarter, such as Q1 in the view of FIG. 2, the user is transferred to the more detailed view of FIG. 3, which lists, graphically or textually, the projects ongoing during the selected quarter and various details pertaining to each. From this view, a particular project may be selected from the list (in a form such as a tab, button, link or the like) in order to edit the selected project or examine it in still greater detail. Additional details pertaining to each project are also displayed, such as, for example, the start date or timing, the demand for the project for the selected quarter, in hours or FTEs, the release date, and the project priority. The displayed details may provide insight to the user regarding the source of meaningful discrepancy between labor supply and labor demand from FIG. 2. If the user can identify, from the details, which project or group of projects may be contributing to the discrepancy between labor supply and labor demand, the user may select that project or group of projects (in a link, button, tab or the like) in order to open it in an editor window 104 (such as in FIG. 4).

FIG. 4 is an illustrative view of an editor window 104 in the interface 102 for real time optioning. As seen in FIG. 4, in various embodiments, the user may enter milestone dates which may include target, actual, or planned dates and/or milestones, for example, by entering in a text field, or choosing from a drop-down menu. Such target, actual or planned dates and/or milestones may include, for example, start dates, approval dates, various contract dates, drop dates, delivery dates, and or warranty dates. The milestone dates may, in various embodiments, identify the contract and code-drop dates for a given project. In various embodiments, the user may additionally enter various release dates and hours of labor anticipated, planned, or actually used, in a release date field (text field or drop-down menu). A project may, in various embodiments, have a release date for different components of the project, such as when a project requires both hardware and software components that are released at specific release times, and which may be similar or different from each other. In various embodiments, in the edit window of the interface 102, the user may enter a priority for the project, either in a drop-down menu or a text field. In additional text fields or drop-down menus, the user may enter or select various duration calculations that may be used, for example, in tracking progress and for setting the code-drop time-line based on the release (employing, for example, the spreading algorithm disclosed in U.S. patent application Ser. No. 11/195,964, entitled "Spreading Algorithm for Work and Time Forecasting," referenced above). Spreading involves using data relating to consumption schedules to estimate resource consumption in each phase of a task to obtain greater insight into and understanding of future needs, and timing projects such that they are feasible within the limits of available resources, and affordable within the limits of budgets. In still another drop-down menu or text field, the user may enter the timing of a flip from expense to capital expenditure for acquisitions made to complete the project.

Also in the editor window 104 of the interface 102, the user may select from various views, in some embodiments by selecting a tab or clicking a link, in order to review the whole of the projects in the tool (e.g., back to view of FIG. 2), with a particular project selected, to review any competing or related projects, and for a particular project, any constraints. The user may additionally select from various views, such as a more detailed view of hardware, software, and vendor labor (as can be seen in FIG. 5), or a more detailed view of timing and budgetary factors relating to flip from expense to capital expenditure.

Figure 5:
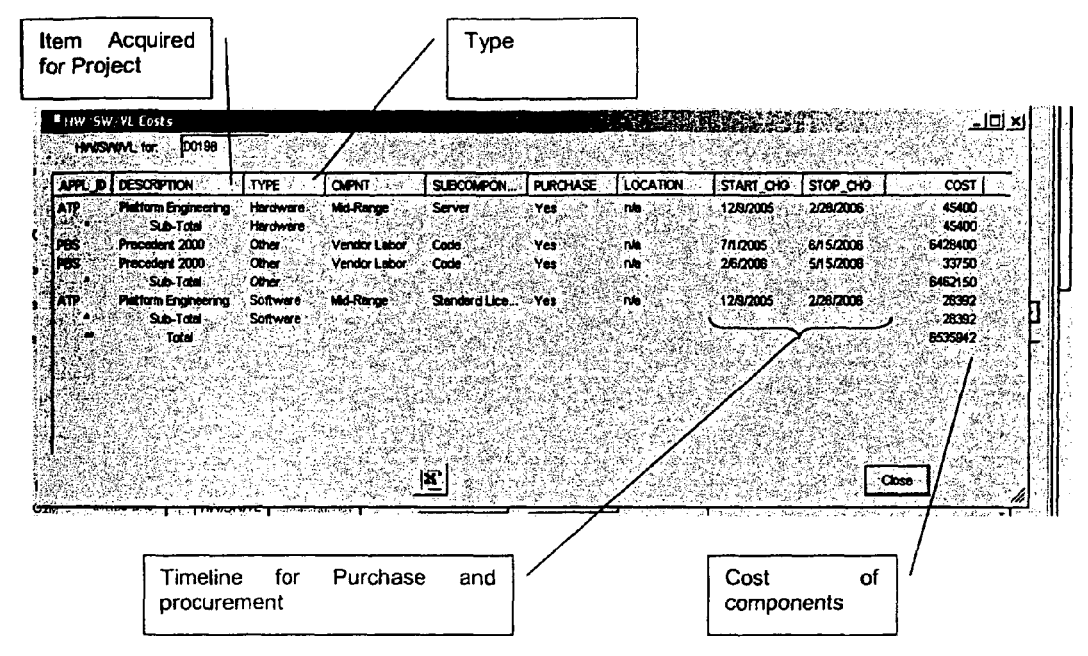

FIG. 5 is an illustrative view of a detailed view of an evaluation window 106 in the interface 102 for real time optioning. As seen in FIG. 5, in various embodiments, the more detailed view includes details relating to hardware, software and vendor labor acquisitions, including timing and budgetary factors. Based on the inputs entered by way of the editor window 104, the evaluation window 106 reflects the identity of one or more items used in completed of the selected project. The evaluation window 106 further displays the type of each of the identified items, timing relating to acquisition of each identified items (such as, for example, start and stop dates), and the cost of each item. Such a view in the evaluation window 106 may additionally include, for example, timing of the capital expenditure/expense flip, other timing constraints that arise from other projects, and the interplay of timing for labor with timing and budgeting for the identified items. In various embodiments, when a test change is entered in the editor window 104, it is reflected in real-time in the evaluation window 106 (e.g., in FIG. 2 for the whole software development pipeline), as well as in each detailed view of the edited project (e.g., FIGS. 4 and 5).

The data store 108 receives the inputs from the interface 102 and stores them. The data store 108 additionally stores the pipeline model generated by the optioning component 112, and the impact of test changes applied to the software development pipeline.

The reporting component 114, in communication with the data store 108, generates various reports using data stored in the data store 108. For example, the reporting component 114 generates a report relating to the balance between the input supply and the resource demands for specific projects including when constraints arise for the aggregate of the projects in the software development pipeline. The report may pertain to a particular period of time, such as a present or upcoming fiscal quarter, or a planning period extending over six financial quarters.

In various embodiments, the reporting component 114 generates a coded report, wherein a first code indicates time periods when a budget constraint will occur, when such as, for example, when actual spending for a project or group of projects exceeds the budget or when an actual ratio of capital expenditure to expenses exceeds a target ratio of capital expenditure to expenses. In the coded report, a second code indicates time periods when a constraint between supply and demand of labor and resources will occur, when such as, for example, when demand for a project or group of projects exceeds the available supply. In the coded report, a third code indicates time periods when a constraint will occur in the release or environment capacities, when such as, for example, timing limitations pertaining to a particular release date prevent the release from occurring when planned. In various embodiments, the coded report is color coded, such that, for example, a green alert is displayed when a budget constraint will occur, a red alert is displayed when a constraint between supply and demand of labor and resources will occur, and a blue alert is displayed when a constraint will occur in the release or environment capacities. Various other visual encoding may be used alternatively to draw attention to constraints, such as symbols, bolded or highlighted text or links, or the like. In various embodiments, various different reports may be generated based on who is going to use the report and how they will use the report. For example, executive reports may be generated for enterprise-wide analysis, financial reports may be generated for accounting and budgeting purposes, and business unit level reports may be generated for more detailed analysis of projects executed within a particular business unit.

Figure 6:
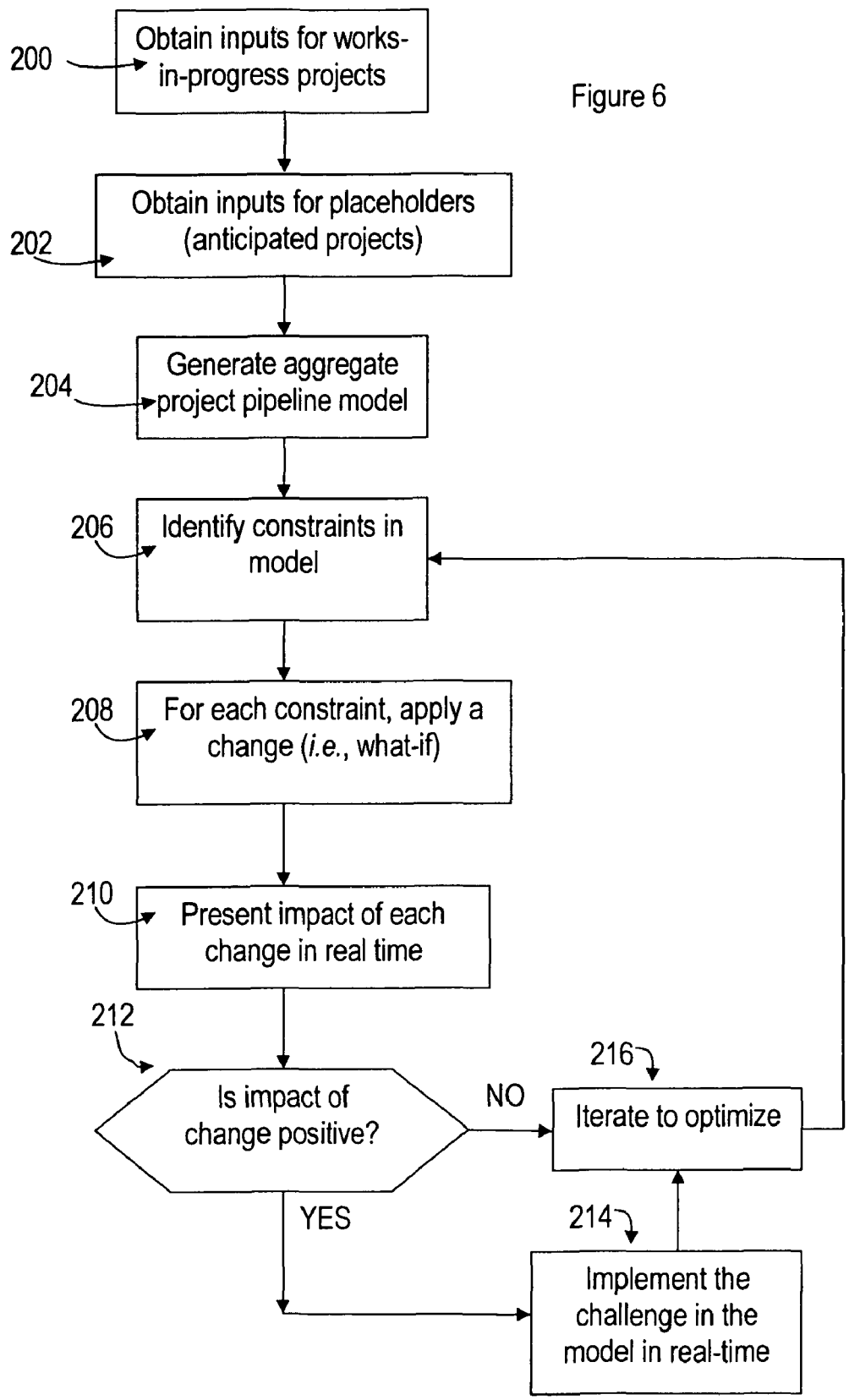
FIG. 6 is a logic flow diagram of a process according to some embodiments of the present disclosure.

Turning now to FIG. 6, a logic flow diagram of a process for real-time optioning is depicted. The process may be practiced as a manual process or as an automated process. In various embodiments, the process for real-time optioning is an ongoing optimization process that continues to cycle as time passes, rather than starting and stopping. The process begins in block 200 where the tool 100 obtains inputs for works-in-progress projects via the editor window 104. The tool 100 also obtains inputs for placeholders relating to anticipated, planned projects via the editor window 104 (block 202). The inputs are stored in the data store 108. In block 204, the optioning component 112 generates an aggregate pipeline model and presents the model in real-time in the evaluation window 106. In various embodiments, spreading and milestone scheduling algorithms, as noted above, may be applied to the inputs by the optioning component 112 to generate the aggregate model and possible test changes to apply.

In block 206, when working in the actual pipeline model, the tool identifies constraints in the pipeline model. Identifying constraints may be performed manually by a user or alternatively by an algorithm run by the optioning component 112. Constraints may be identified, for example, based on when budgets are exceeded, when demand exceeds supply, when supply exceeds demand, when timing of projects causes a chokepoint in the software development pipeline, and the like. Constraints may be identified, for example, based on when projects exceed various thresholds (such as when a budget is exceeded, when demand exceeds supply, or when supply exceeds demand), or exceed various thresholds by more than an acceptable percentage that may be ascertained by enterprise management.

In block 208, for each constraint identified, a test change (as will be discussed further below) is applied by the optioning component 112. Various types of test changes may be applied, as will be discussed with reference to FIGS. 7, 8, and 9. In block 210, the impact of the test change of block 208 is presented in real-time, such as in the pipeline model displayed in the evaluation window 106. In block 212, the question "Is the impact of the test change on the pipeline model positive?," i.e., does the test change at least in part reduce the constraint. If the impact is positive, the test change is implemented in the pipeline model in real-time (block 214). If the impact is not positive, the test change may be undone, deleted, and replaced by other test changes by iteration and optimization, or other test changes may be applied additionally to further correct for increased constraints by iteration and optimization (block 216).

Figure 7:
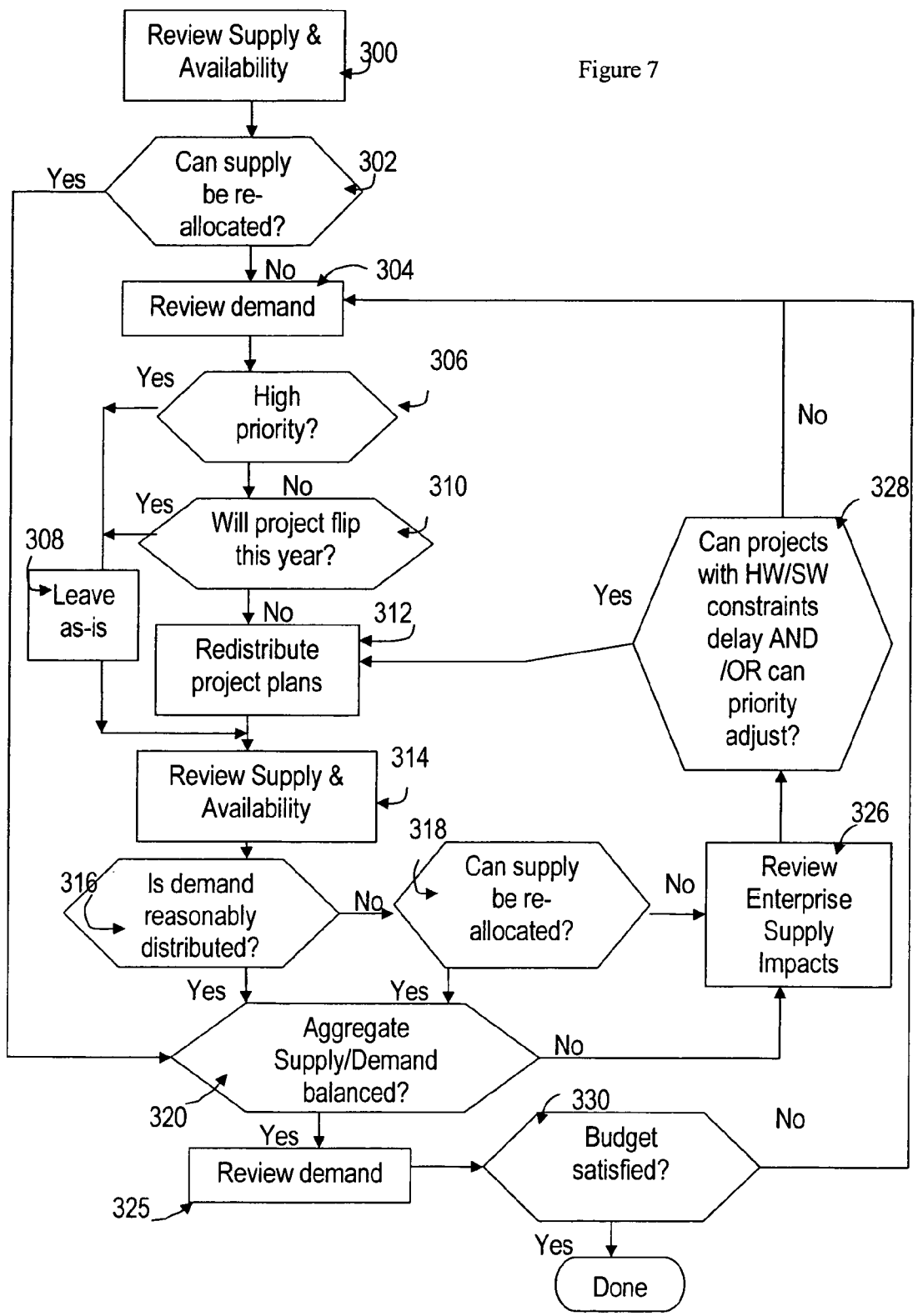
FIG. 7 is a logic flow diagram of a process of optioning a supply change according to some embodiments of the present disclosure.

Turning now to FIG. 7, a logic flow diagram of an optioning process for a supply test change is provided. The process of FIG. 7 may be implemented in the actual pipeline model, or while working in the sandbox with a virtual copy of the pipeline model. r Additionally, in various embodiments, the optioning process of FIG. 7 may be at least partially or wholly automated by an algorithm in the software tool 100.

A supply test change may be applied, for example, when a constraint arises with respect to the supply of labor. Such a constraint may arise when supply exceeds a threshold over demand, or a certain percentage over demand, with respect to a particular project, or a group of projects, such as projects for a particular business unit or division. Without the tool of the present disclosure, a supply constraint may result in unnecessary lay-offs or canceling contracts of contractors that may be needed again within the six quarter plan.

In block 300, the tool reviews supply and availability. The review of supply and availability may be accomplished manually by the user or according to automated comparison to various designated thresholds. In block 302, the tool analyzes the question "can the supply be re-allocated?" As a test change, re-allocation may, for example, be performed by shifting individuals with certain skill sets to a different project, group of project or even different business unit or division to avoid termination of employment. If the supply can be re-allocated in a test change, the tool proceeds to review of the aggregate balance between supply and demand (in block 320), discussed further below.

If supply cannot be re-allocated in a test change, for example, to a different project, group of projects, and/or business unit, then demand for a project (or group of projects) is reviewed (in block 304). The review of demand may be accomplished manually by the user or according to automated comparison to various designated thresholds. In the review of demand, the tool analyzes the question "is the project (or group of projects) classified as high priority?" (block 306). If the project, or group of projects, is high priority, then the demand is left as-is without alteration (block 308). If the project (or group of projects) is not classified as high priority, then the tool analyzes the question "will the project (or group of projects) flip from expense to capital expenditure within the present calendar year?" (block 310). If the project (or group of projects) will flip within the present calendar year, then the demand is left as-is without alteration (block 308). If the project (or group of projects) will not flip within the present calendar year, the plan for the project (or group of projects) is redistributed in a test change (block 312). In various embodiments, redistribution as a test change may be performed manually by the user, or according to automated algorithms, such as those discussed above for milestone scheduling and spreading.

Having left the project (or group of projects) as-is without alteration or redistributing, the tool proceeds to review supply and availability again (block 314). The tool analyzes the question "is demand for the project (or group of projects) reasonably distributed?" (block 316). The analysis may be performed manually by the user or according to automated comparison to various designated thresholds. If the demand for the project (or group of projects) is reasonably distributed, then the tool proceeds to analyze the question "is the aggregate of supply/demand balanced?" (block 320).

If, in block 316, the demand for the project (or group of projects) is not reasonably distributed, the tool analyzes the question "can supply be re-allocated?" (block 318). If the supply can be re-allocated in a test change, then the tool proceeds to analyze the question "is the aggregate of supply/demand balanced?" (block 320). If the supply cannot be re-allocated (in block 318), the tool proceeds to review enterprise-wide supply impacts (block 326).

From the review of enterprise-wide supply impacts, the tool proceeds to an analysis of the question "can projects with hardware or software constraints be delayed and/or can the priority classification be adjusted?" (block 328). If the answer to either question in block 328 is yes, then the project(s) may be redistributed in a test change by delay or changing the priority classification (block 312). If the answer to both questions in block 328 is no, then the tool reiterates by reviewing demand again (block 304).

From the analysis of the aggregate of supply/demand balance (in block 320), the tool proceeds to review demand (block 325). Then tool then proceeds to a financial review by analyzing the question "is the budget satisfied?" (block 330). If the budget is satisfied, then the test change is complete, and the appropriate test changes to the pipeline model have been implemented. If the budget is not satisfied in block 330, then the tool reiterates by reviewing demand again (block 304).

Figure 8:
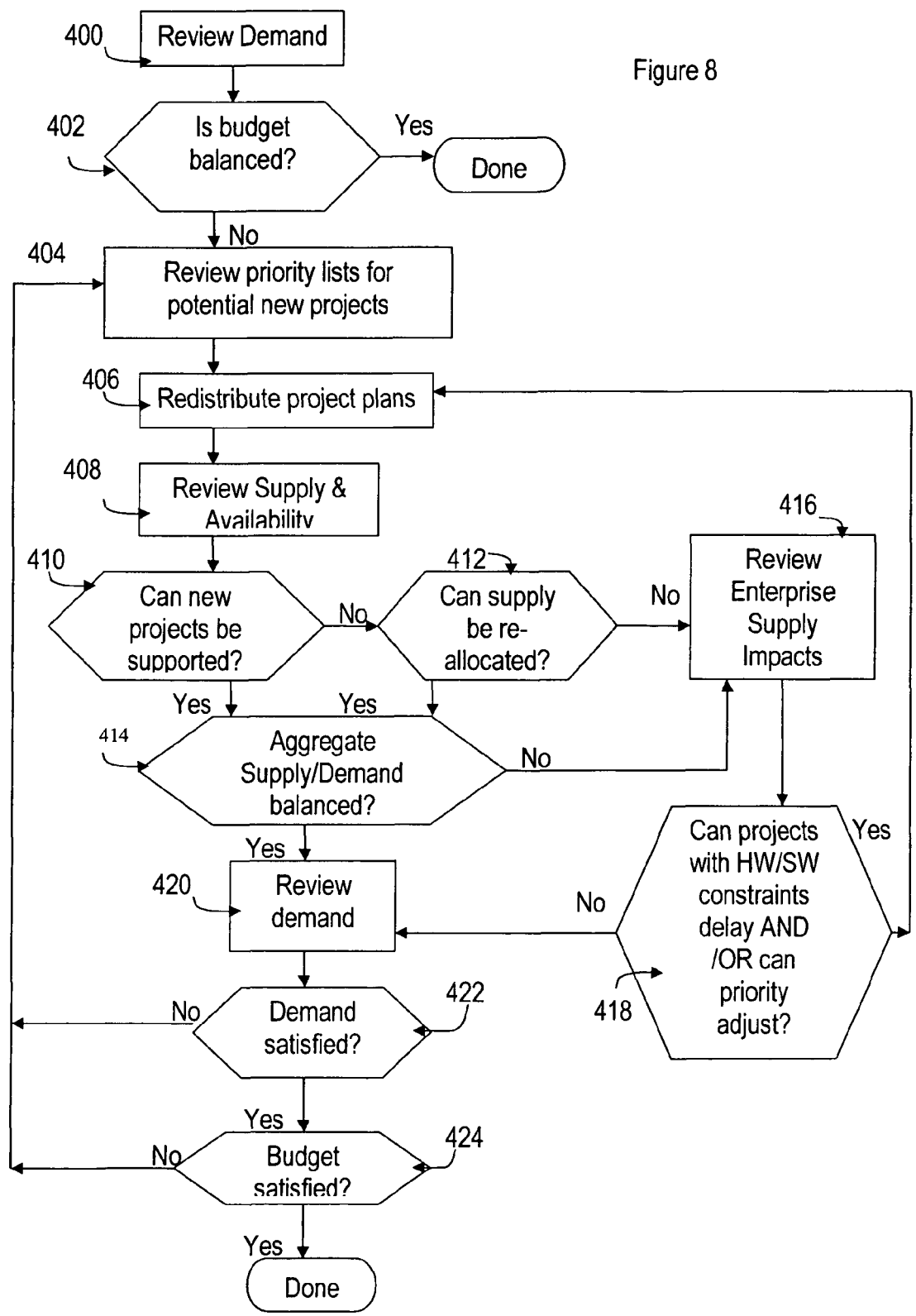
FIG. 8 is a logic flow diagram of a process of optioning a demand change according to some embodiments of the present disclosure.

Turning now to FIG. 8, a logic flow diagram of an optioning process for a demand test change is provided. The process of FIG. 8 may be implemented in the actual pipeline model, or while working in the sandbox with a virtual copy of the pipeline model. Additionally, in various embodiments, the optioning process of FIG. 8 may be at least partially or wholly automated by an algorithm in the software tool 100.

A demand test change may be applied, for example, when a constraint arises with respect to the demand for resources for a given project or group of projects. Such a constraint may arise when demand exceeds a threshold over the available supply or a certain percentage over supply, with respect to a particular project, or a group of projects, such as projects for a particular business unit or division. Without the tool of the present disclosure, a demand constraint may result in unnecessary canceling of projects or delay that has negative impact on the software development pipeline.

In block 400, the tool reviews demand. The review of demand may be accomplished manually by the user or according to automated comparison to various designated thresholds. In block 402, the tool analyzes the question "is the budget balanced for this particular allocation of demand?" If the budget is satisfied, then the test change is complete, and the appropriate test changes (or lack thereof) to the pipeline model have been implemented.

If the budget is not balanced, the tool proceeds to review enterprise priority lists to identify potential new projects (block 404). Selecting at least one new project from the priority list, in block 406, the project plans are redistributed in a test change. In various embodiments, redistribution as a test change may be performed manually by the user, or according to automated algorithms, such as those discussed above for milestone scheduling and spreading.

Having redistributed the project plans, the tool proceeds to review supply and availability for the software development pipeline with the redistribution (block 408). The tool analyzes the question "can new projects be supported?" (block 410). The analysis may be performed manually by the user or according to automated comparison to various designated thresholds. If new projects can be supported (i.e., a test change to add new projects), the tool proceeds to analyze the question "is the aggregate of supply/demand balanced?" (block 414).

If, in block 410, new projects cannot be supported, the tool analyzes the question "can supply be re-allocated?" (block 412). If the supply can be re-allocated in a test change, then the tool proceeds to analyze the question "is the aggregate of supply/demand balanced?" (block 414). If the supply cannot be re-allocated (in block 412), the tool proceeds to review enterprise-wide supply impacts (block 416). From the review of enterprise-wide supply impacts, the tool proceeds to an analysis of the question "can projects with hardware or software constraints be delayed and/or can the priority classification be adjusted?" (block 418). If the answer to either question in block 418 is yes, then the project(s) may be redistributed in a test change by delay or changing the priority classification (block 406). If the answer to both questions in block 418 is no, then the tool proceeds to review demand (block 420).

From the analysis of the aggregate of supply/demand balance (in block 414), the tool proceeds to review demand (block 420). The tool analyzes the question "is demand satisfied?" (block 422). If the demand is not satisfied, the tool proceeds to review priority lists to identify potential new projects (block 404). If the demand is satisfied, the tool then proceeds to a financial review by analyzing the question "is the budget satisfied?" (block 424). If the budget is satisfied, then the test change is complete, and the appropriate test changes to the pipeline model have been implemented. If the budget is not satisfied in block 424, then the tool reiterates by reviewing the priority lists further to identify potential new projects and add them as test changes (block 404).

Figure 9:
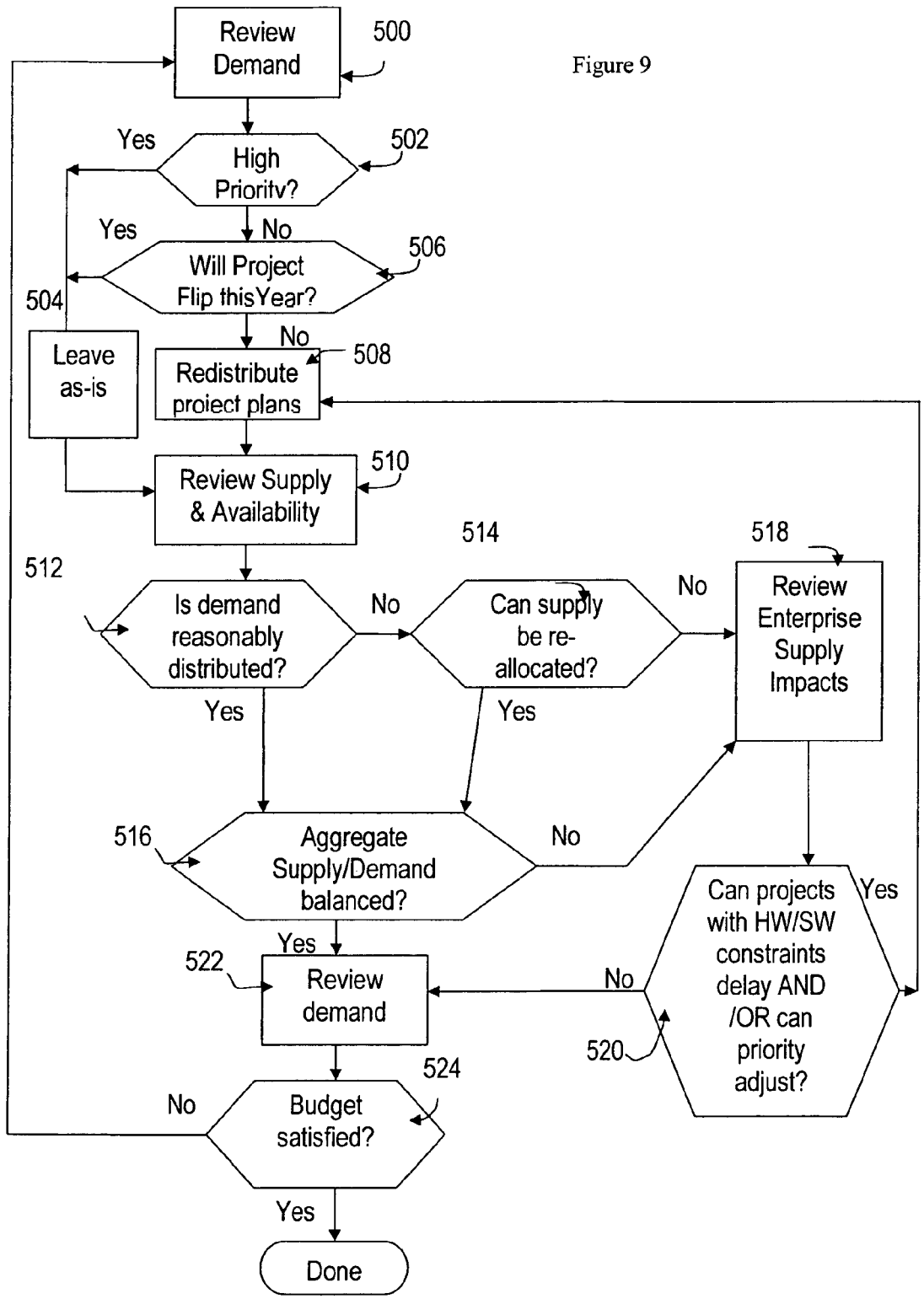
FIG. 9 is a logic flow diagram of a process of optioning a financial change according to some embodiments of the present disclosure.

Turning now to FIG. 9, a logic flow diagram of an optioning process for a financial test change is provided. The process of FIG. 9 may be implemented in the actual pipeline model, or while working in the sandbox with a virtual copy of the pipeline model. Additionally, in various embodiments, the optioning process of FIG. 9 may be at least partially or wholly automated by an algorithm in the software tool 100.

A financial test change may be applied, for example, when a constraint arises with respect to the budget for a given project or group of projects. Such a constraint may arise when actual or projected expenses exceed a threshold over the planned budget or a certain percentage over the budget, with respect to a particular project, or a group of projects, such as projects for a particular business unit or division. Without the tool of the present disclosure, a financial constraint may result in unnecessary canceling of projects or imbalanced financial planning.

In block 500, the tool reviews demand. The review of demand may be accomplished manually by the user or according to automated comparison to various designated thresholds. In block 502, the tool analyzes the question "is the project (or group of projects) classified as high priority?" If the project (or group of projects) is classified as high priority, then the project (or group of projects) is left as-is without alteration (block 504). If the project (or group of projects) is not classified as high priority, then the tool analyzes the question "will the project (or group of projects) flip from expense to capital expenditure within the present calendar year?" (block 506). If the project (or group of projects) will flip within the present calendar year, then the project (or group of projects) is left as-is without alteration (block 504). If the project (or group of projects) will not flip within the present calendar year, the plan for the project (or group of projects) is redistributed in a test change (block 508). In various embodiments, redistribution as a test change may be performed manually by the user, or according to automated algorithms, such as those discussed above for milestone scheduling and spreading.

Having left the project (or group of projects) as-is without change (block 504) or redistributing (block 508), the tool proceeds to review supply and availability (block 510). The tool analyzes the question "is demand for the project (or group of projects) reasonably distributed?" (block 512). The analysis may be performed manually by the user or according to automated comparison to various designated thresholds. If the demand for the project (or group of projects) is reasonably distributed, then the tool proceeds to analyze the question "is the aggregate of supply/demand balanced?" (block 516).

If, in block 512, the demand for the project (or group of projects) is not reasonably distributed, the tool analyzes the question "can supply be re-allocated?" (block 514). If the supply can be re-allocated in a test change, then the tool proceeds to analyze the question "is the aggregate of supply/demand balanced?" (block 516). If the supply cannot be re-allocated in a test change (in block 514), the tool proceeds to review enterprise-wide supply impacts (block 518).

From the review of enterprise-wide supply impacts (block 518), the tool proceeds to an analysis of the question "can projects with hardware or software constraints be delayed and/or can the priority classification be adjusted?" (block 520). If the answer to either question in block 520 is yes, then the project(s) may be redistributed in a test change by delay or changing the priority classification (block 508). If the answer to both questions in block 520 is no, then the tool reiterates by reviewing demand again (block 522).

From the analysis of the aggregate of supply/demand balance (in block 516), the tool proceeds to review demand (block 522). Then tool then proceeds to a financial review by analyzing the question "is the budget satisfied?" (block 524). If the budget is satisfied, then the test change is complete, and the appropriate test changes to the pipeline model have been implemented. If the budget is not satisfied in block 524, then the tool reiterates by reviewing demand again (block 500).

Figure 10:
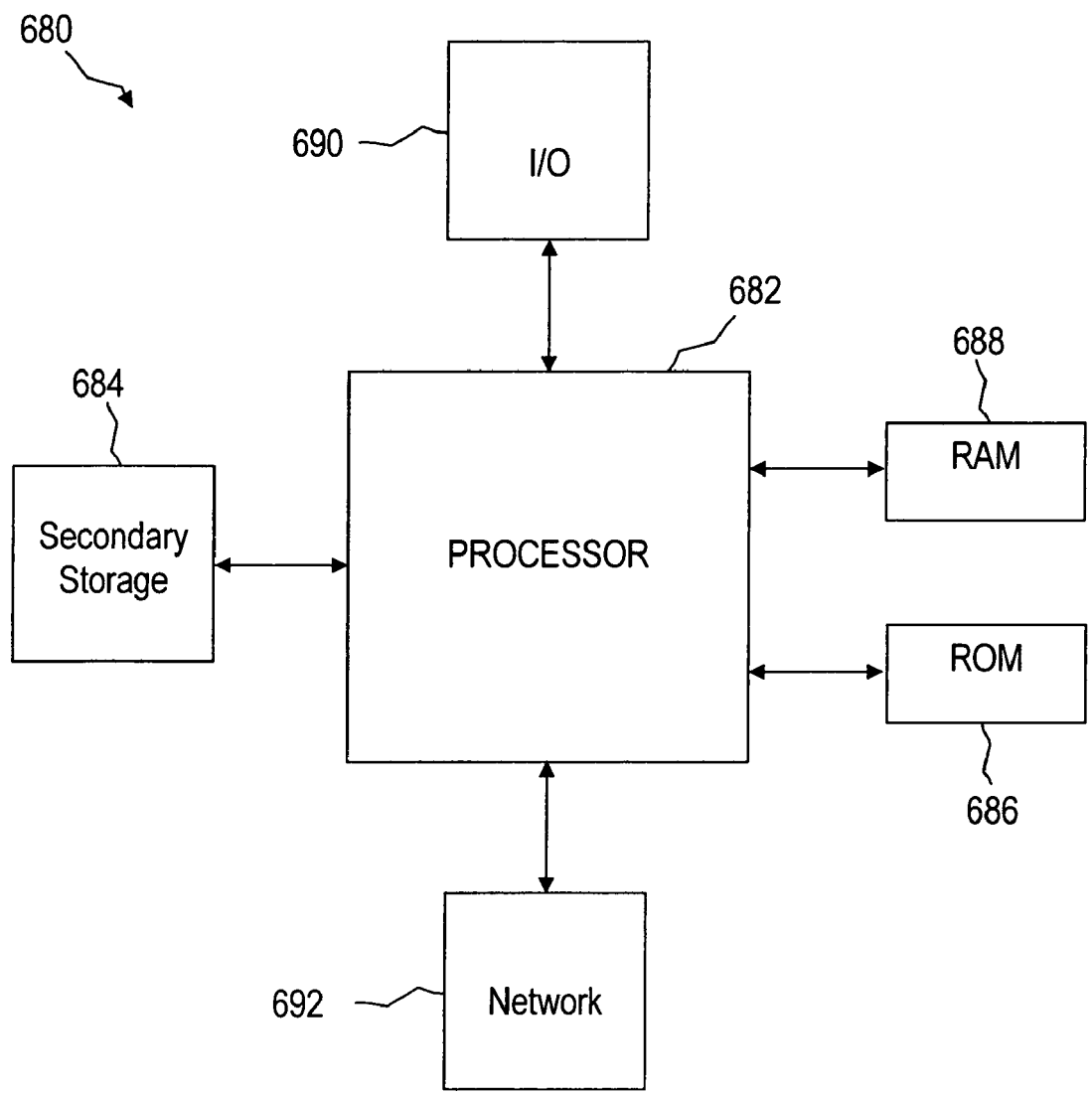
FIG. 10 illustrates an illustrative general purpose computer system suitable for implementing the several embodiments of the disclosure.

The system described above may be implemented on any general-purpose computer with sufficient processing power, memory resources, and network throughput capability to handle the necessary workload placed upon it. FIG. 10 illustrates a general-purpose computer system suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) 690 devices, and network connectivity devices 692. The processor may be implemented as one or more CPU chips.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage. The RAM 688 is used to store volatile data and perhaps to store instructions. Access to both ROM 686 and RAM 688 is typically faster than to secondary storage 684.

I/O 690 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 692 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 692 devices may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity 692 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A software development pipeline tool, comprising:
   an interface component in a non-transitory computer readable medium and executable by a processor to accept, for each of multiple projects in a software development pipeline, a set of inputs describing attributes and requirements of the corresponding project, each set of inputs being one of 1) a set of work-in-progress inputs relating to a current project in a software development pipeline and 2) a set of placeholder inputs relating to a future project in the software development pipeline, wherein each set of inputs includes at least a project priority input and a flip date input designating a time when the corresponding project is scheduled to flip from an expense to a capital expenditure; and
   an optioning component in a non-transitory computer readable medium and executable by a processor that:
      aggregates the inputs to generate a model of the software development pipeline;
      identifies one or more constraints in the model, wherein each of the plurality of constraints arises when a project of the multiple projects cannot be achieved as planned based on the inputs; and
      performs an optioning process to resolve the one or more constraints, the optioning process comprising:
         determining if one or more of the multiple projects are to be left as-is and not receive test changes, wherein a project is left as-is when at least one of the project priority input of the project is a high priority and the flip date input of the project is within a present calendar year;
         selecting one or more of the multiple projects other than the as-is projects to receive one or more test changes;
         implementing a test change to one or more of the plurality of inputs of the selected projects that has an impact on the one or more constraints in the model of the software development pipeline;
         outputting, in real-time, the impact of each test change on the one or more constraints in the model of the software development pipeline; and
         in response to determining that at least one constraint is still identified in the model, repeating the steps of the optioning process.

2. The tool of claim 1, wherein the set of inputs for each project further comprises inputs selected from the group of target start date, target stop date, budget, target release date, resource demands, and project priority.

3. The tool of claim 1, wherein the test change further comprises implementing at least one of 1) a supply test change, 2) a demand test change, and 3) a financial test change.

4. The tool of claim 1, wherein if the impact on the software development pipeline is not positive, the optioning component implements at least one of 1) a deletion of the test change that does not have a positive impact on the one or more constraints in the software development pipeline, and 2) one or more additional test changes.

5. The tool of claim 1, wherein the optioning component identifies the one or more constraints in the software development pipeline and implements at least one test change in order to address at least one of the constraints.

6. The tool of claim 1, wherein the test change comprises at least one of a supply test change, a demand test change, and a financial test change.

7. The tool of claim 1, further comprising a reporting component that generates a report on the impact, positive or negative, of the test change to the software development pipeline, and displays the report in real time as any test change is implemented.

8. The tool of claim 1, wherein the reporting component notifies a manager of any project impacted by any test change.

9. A method of real-time optioning, comprising:
    providing, for each of multiple projects in a software development pipeline, a set of inputs describing attributes and requirements of the corresponding project, each set of inputs being one of 1) a set of work-in-progress inputs relating to a current project in a software development pipeline and 2) a set of placeholder inputs relating to a future project in the software development pipeline, wherein each set of inputs includes at least a project priority input and a flip date input designating a time when the corresponding project is scheduled to flip from an expense to a capital expenditure;
    aggregating the inputs to generate a model of the software development pipeline;
    identifying, automatically by a computing device, a plurality of constraints in the model, wherein each of the plurality of constraints arises when a project of the multiple projects cannot be achieved as planned based on the inputs; and
    performing an automatic optioning process by the computing device to resolve the plurality of constraints, the optioning process comprising:
        determining if one or more of the multiple projects are to be left as-is and not receive test changes, wherein a project is left as-is when at least one of the project priority input of the project is a high priority and the flip date input of the project is within a present calendar year;
        selecting one or more of the multiple projects other than the as-is projects to receive one or more test changes;
        implementing a test change on one or more of the plurality of inputs of the selected projects that has an impact on one or more of the plurality of constraints in the model of the software development pipeline;
        outputting, in real-time, for each test change, the impact of the test change on the one or more constraints in the model of the software development pipeline; and
        in response to determining that at least one constraint is still identified in the model, repeating the steps of the optioning process.

10. The method of claim 9, further comprising notifying a user when the impact is negative.

11. The method of claim 9, further comprising notifying a manager of any project impacted by any test change.

12. The method of claim 9, further comprising generating a report in the aggregate, wherein a first code indicates when in the software development pipeline the impact of the test change on the corresponding constraint of the plurality of constraints is positive, and a second code indicates when in the software development pipeline the impact of the test change on the corresponding constraint of the plurality of constraints is negative.

13. The method of claim 11, further comprising generating a report reflecting the plurality of constraints.

14. The method of claim 9, further comprising implementing at least one of 1) a deletion of the test change that does not have a positive impact on the corresponding constraint of the plurality of constraints in the software development pipeline, and 2) one or more additional test changes until a positive impact is achieved, if the impact of the test change on the corresponding constraint of the plurality of constraints in the software development pipeline is not positive.

15. The method of claim 9, wherein implementing the test change further comprises implementing at least one of 1) a supply test change, 2) a demand test change, and 3) a financial test change.

* * * * *